United States Patent [19]

Broding

[11] Patent Number: 4,740,930
[45] Date of Patent: Apr. 26, 1988

[54] SURFACE PROCESSING AND DISPLAY OF BOREHOLE TELEVIEWER SIGNALS

[75] Inventor: Robert A. Broding, Tulsa, Okla.

[73] Assignee: Amoco Corporation, Chicago, Ill.

[21] Appl. No.: 816,669

[22] Filed: Jan. 7, 1986

Related U.S. Application Data

[63] Continuation of Ser. No. 682,407, Nov. 21, 1984, which is a continuation of Ser. No. 271,304, Jun. 8, 1981, abandoned.

[51] Int. Cl.⁴ .............................................. G01V 1/40
[52] U.S. Cl. ..................................... 367/69; 367/71; 358/112
[58] Field of Search ............................ 367/68, 69, 71; 358/112

[56] References Cited

U.S. PATENT DOCUMENTS

3,668,619  6/1972  Dennis .................................. 367/69
3,742,289  6/1973  Koeijmans ........................... 367/71
4,633,448  12/1986  Koeijmans ........................... 367/68

Primary Examiner—Nelson Moskowitz
Assistant Examiner—Ian J. Lobo

[57] ABSTRACT

Method and apparatus for storing, displaying and processing borehole televiewer signals, comprises digitizing means for the electrical scan signals (ESS), and for storing them in a register at slow input rates until a full 360° scan is completed. A RAM provides storage for a full frame of T.V. raster scan signals, which are being withdrawn from the RAM, to the TV monitor, and back to the RAM. As complete rotary ESS are accumulated they are injected into the stream of circulating video signals to add a new line. Then a second line is accumulated at slow scan rate, read out at TV raster scan rate to add a second line to update the display, and so on. Means are provided for processing the data stored in the RAM in a variety of ways.

32 Claims, 7 Drawing Sheets

1 SLOW SCAN = 1 PIXEL
256 PIXELS/LINE

TV RASTER SCAN
256 PIXELS/LINE

SURFACE PROCESSING AND DISPLAY OF BOREHOLE TELEVIEWER SIGNALS

CROSS-REFERENCES TO RELATED APPLICATIONS

This is a continuation of copending application Ser. No. 682,407, filed Nov. 21, 1984, which is a continuation of copending application 271,304, filed June 8, 1981, now abandoned.

This application is related to my issued U.S. Pat. Ser. No. 4,524,433 and my two copending applications, Ser. No. 242,497, filed Mar. 10, 1981, and Ser. No. 524,498, filed Aug. 18, 1983, itself a continuation of co-pending prior application Ser. No. 242,220, filed Mar. 10, 1981.

BACKGROUND OF THE INVENTION

1. Field of the Invention

This invention relates to borehole televiewer signals, or rotary scan signals, whether produced by a single sub-surface rotating transducer or from a plurality of rotating transducers. It provides a system for on-line processing of the borehole scan signals so that for each rotation of the transducer producing a selected number of separate sonic scan signals, each of which is customarily recorded as a horizontal line, or as an elliptical line, with successive repetitions of the sonic scan signal being placed beside the previous one so as to form a plurality of line traces or "helical traces" on a page. These are normally recorded on a cathode ray tube type recorder.

More particularly, it concerns the on-line processing of signals at the surface, so that a variety of signal enhancement processes can be applied to the incoming signals in order to make them more noise-free, or to better illustrate the geology of the walls of the borehole.

2. Description of the Prior Art

Examples of the prior art are illustrated by U.S. Pat. Nos. 3,369,626, entitled: "METHOD OF AND APPARATUS FOR PRODUCING A VISUAL RECORD OF PHYSICAL CONDITIONS OF MATERIALS TRAVERSED BY A BOREHOLE", issued Feb. 20, 1968 in the name of J. Zemanek, Jr.; 3,668,619, entitled: "THREE-DIMENSIONAL PRESENTATION OF BOREHOLE LOGGING DATA", patented June 6, 1972 in the name of Charles L. Dennis; 3,550,075 entitled: "SYSTEM FOR DISPLAYING TIME INFORMATION IN ACOUSTIC WELL LOGGING SYSTEM", issued Dec. 22, 1970 to D.W. Hilchie et al; and 3,835,953 entitled: "ACOUSTIC CALIPER LOGGING", issued Sept. 17, 1974 to Jerald C. Summers. There is also additional art recorded in the form of other patents, and in technical papers presented at technical society meetings, so that further description or statement of the art is not necessary at this time.

The prior art has provided only a very simple presentation of the circular scans of the transducer in the borehole, such as the amplitude of the reflected sonic pulse as a function of angle of rotation of the sonic transducer. Another presentation would be the time of travel of the sonic pulse out from the transducer and back to the transducer from a reflecting surface. In the former presentation, each individual amplitude at one angle of rotation represents one pixel of the display. Separately, the caliper has been displayed in a way such as illustrated in the Summers patent.

SUMMARY OF THE INVENTION

It is a primary object of this invention to provide a surface data processing method and apparatus, by which conventional or improved sonic rotary scan signals can be received at the surface, at their normally slow speed of production or recording, stored in a digital memory, and subsequently played out at a much higher rate of scanning, corresponding specifically to the rate of raster scan of a conventional television display or monitor system. This processing apparatus that converts a slow scan signal to a rapid scan TV raster signal, plus a memory storage, provides an opportunity for a wide variety of processing techniques, not only to enhance the quality of the data; that is, the signal-to-noise ratio, but also to provide a type of display that tends to accentuate the particular information that it is intended to provide.

These and other objects are realized and the limitations of the prior art are overcome in this invention by providing data processing apparatus at the surface end of the cable, which supports and carries the sonde, which contains the rotating scanning transducer or transducers. The signals which reach the surface are preferably permanently recorded. They can be digitized at the sonde, or transmitted as analog signals, and recorded at the surface for a permanent record.

At the same time, they can be digitized and stored in a memory at the incoming digital bit rate and read out from that memory at high scan TV raster speeds, which are then displayed on a TV monitor as a continuing, on-line picture, or display, of the data reaching the surface.

The types of recording of the scan signals at the surface were illustrated and described in FIG. 8 of my abandoned application, Ser. No. 242,504. That FIG. is included as FIG. 1 of this application and is again fully described so as to provide an introduction to the additional improvements in signal processing provided by this invention.

In addition to providing a permanent storage of the information arriving through the cable to the surface, it is possible, and apparatus is shown, for digitizing the sonic scan signals, storing them in a random access memory, and playing them out of that memory at a high bit rate so as to form a continuous television picture of successive rotary scans of the transducer in the sonde.

Such an apparatus for changing the time scale of an analog signal from one time scale to a higher frequency time scale, was illustrated and described in terms of FIG. 8 and 9 of my issued U.S. Pat. No. 4,524,433. Both of these figures are included for background as FIGS. 2 and 3 respectively of this application.

This invention goes farther along the line of recording and processing the sonic scan data, by providing a universal system that can be used whether the incoming signal is analog or digital. The slow scans, which are timed in accordance with the rotational speed of the transducer, go to a gate register which is similar in many respects to the previously mentioned FIG. 8 of my now abandoned application, Ser. No. 242,504. It is modified, however, to provide a very much higher speed of readout of the stored data, so that the line repetition, or signals corresponding to each rotation of the sonde, can be played out very rapidly so that a number such as 240 (for example) sequential rotations of the sonde can be displayed as one page on the face of a TV monitor. As previously mentioned, the treatment of the transmitted and reflected sonic signal can be done as at present by means of which the amplitude of the reflected signal from one sonic pulse is recorded as one pixel along the line of scans, such as 256, in one rotation of the sonde. Also, a spot of light or pixel on the TV monitor can represent, by gray scale, or by color, the travel time of the sonic pulse from the transmitter to a reflecting surface such as the wall of the borehole and back to the transducer.

In addition to the linear presentation of each circular scan as a plurality of parallel horizontal lines, it is possible, in accordance with the art taught by Dennis, U.S. Pat. No. 3,668,619, to display these lines of say 256 independent transmitted pulses, in the form of a circle on a polar diagram, or in the form of an ellipse (which corresponds to a tilted circle) with a varying angle of tilt, at the control of the operator.

Dennis in his patent describes how the pulse amplitude can be displayed in this manner with useful results. He does not suggest how the times of travel or the caliper measurement can be similarly applied. On the other hand, Summers, who describes how to obtain the caliper measurement from the sonic signals, displays them in an entirely different format, which has no connection whatsoever with this present invention.

The processing apparatus at the surface has a number of features which will be described in great detail in conjunction with FIGS. 4, 5, and 6. For the present, all that is necessary to say is that this apparatus can provide whatever type of display has been provided by simply recording on a cathode ray type or recorder, such as a horizontal line, or an elliptical line, of amplitude, or as a vertical curve displaced from a vertical line, for caliper, plus more.

Figure 4:
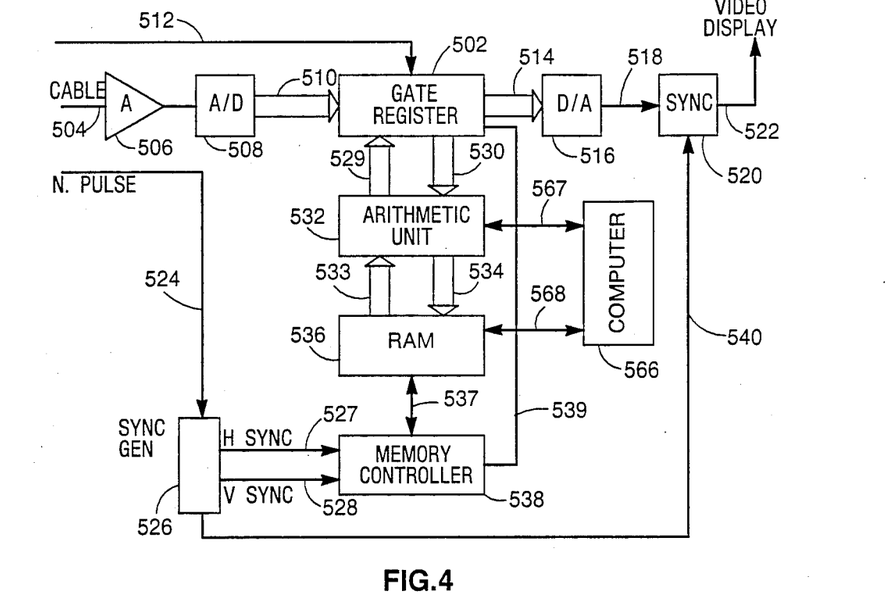
FIG. 4 is a representation of an apparatus for converting from the slow rotary scan of the transducer to the high frequency raster scan of the TV display monitor.
Figure 5:
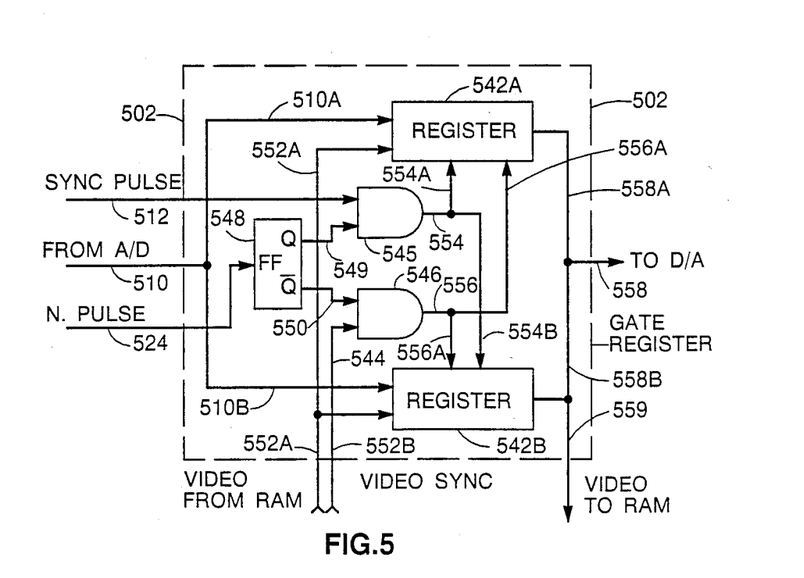
FIG. 5 is a more detailed display of one part; namely, the gate register of FIG. 4.
Figure 6:
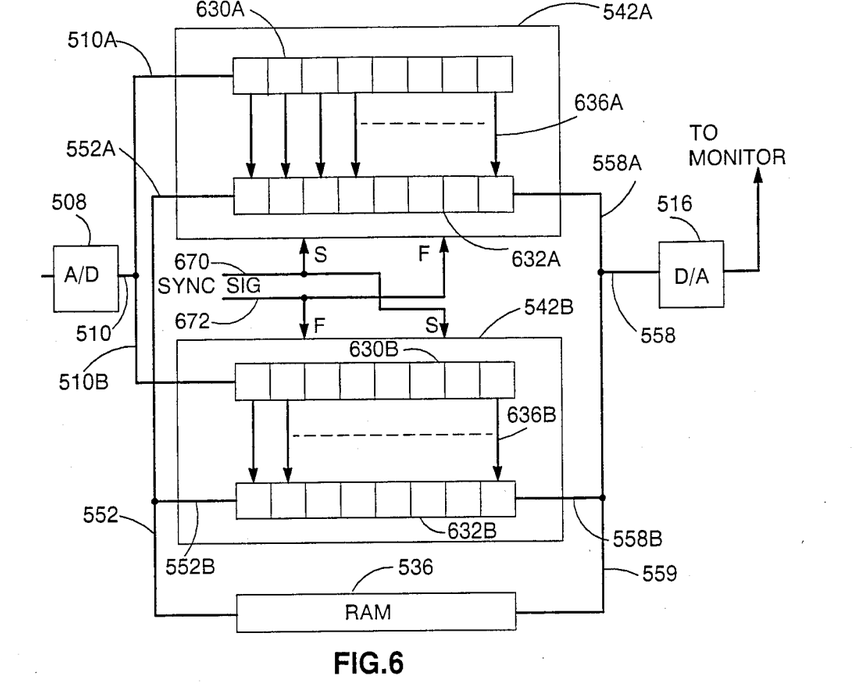
FIG. 6 provides further details of FIGS. 4 and 5.

I have found that by converting the received logging signals from slow scan to TV raster scan, by the apparatus of FIGS. 4, 5, and 6, they will be stored in a memory which can be a static or a dynamic refreshing memory, which by manipulation can take this stored data and play it out in a number of different ways. For example: Having a radial display of caliper as a function of angle of rotation (perpendicular to the recording axis of the sonde), the variation of radius with angle is easily seen as the rotation of the transducer continues. It is possible to convert this circular scan into a horizontal line. However, on the page display of horizontal lines, very little information can be appreciated, except at the extreme edges of the lines. There the variable radius of the caliper signal will provide a non-linear contour on the side which would represent the actual radius of the borehole or other reflecting surface at only one angle of the transducer.

Having these data in the memory, a control is provided by means of which the angle of display is rotated slowly, so that successively each of the angles of the transducer which provides a different sonic scan will continually change the caliper to what it would be if taken on a different vertical plane rotated about the axis of the borehole. Thus, by this means it is possible to see the caliper of the wall of the borehole over a selected length of hole, at each of say 256 or more angular positions.

If the bore has a circumferential wash-out over a limited length of hole, then the contour will remain substantially the same as the display is rotated. However, if the borehole or reflecting surface has a vug, or depression, such as a cylindrical hole perhaps provided by a perforator bullet, for example, then at only one angle or over a limited angular rotation of the sonde will that bullet hole be visible.

Having the information of caliper as a function of angular rotation and vertical translation over a selected distance to form a page of the TV raster display, it is possible to convert the value of travel time to a color code, such that increase in time, or caliper, can be represented by changes from one color to other colors. Thus on a page display, in a linear form, the color of the pixels of that display will indicate the surface contour of the wall of the borehole. Of course, it is also possible to display the 360° of rotation as a pair of displays of 180°, thus representing one-half of the borehole in one display and the other half of the borehole in the other display. These two displays could be positioned side-by-side.

Furthermore, having the scan data over a limited length of hole in the memory, and having it continuously played out to refresh the TV monitor signal, there are arithmetic operations that can be carried out on the data. These might be, for example, adding or subtracting one horizontal line from an adjacent horizontal line. Adding the two provides for an improved signal-to-noise ratio. Thus, it is possible to add a plurality of such lines to provide an improved signal, and then display a running average of these summed lines, for example.

It is also possible to provide the sums of say two to four or more adjacent lines, and subtract one set of four from the set of four just above it. In this case, if there is no substantial variation in the borehole wall, the subtraction will provide a pure white surface without signal. However, if there is a feature such as a spot or a crevice or fracture that is present in one sum and not in the other sum, there will be a very pronounced black spot representing the difference between the two signals. In this way, minor variations in the signal from line-to-line which would not be easily seen by the eye on a variable density or variable color display, can be immediately enhanced in this way to provide clear information about the presence of that causitive factor.

Not only can the summation be between horizontal lines in the display, but it can be arithmetic addition or subtraction of adjacent pixels in each of the lines. Also, it can be an additive or subtractive process between lines at a selected angle to the horizontal, by selecting those pixels on a group of lines which fall at a slope selected by a line drawn across the page display; and as this line moves upwardly or downwardly parallel to itself, the lines of pixels can be added or subtracted and processed in other ways.

BRIEF DESCRIPTION OF THE DRAWINGS

These and other objects and advantages of this invention and a better understanding of the principles and details of this invention will be evident from the following description taken in conjunction with the appended drawings in which.

DETAILED DESCRIPTION OF THE PREFERRED EMBODIMENTS

Figure 1:
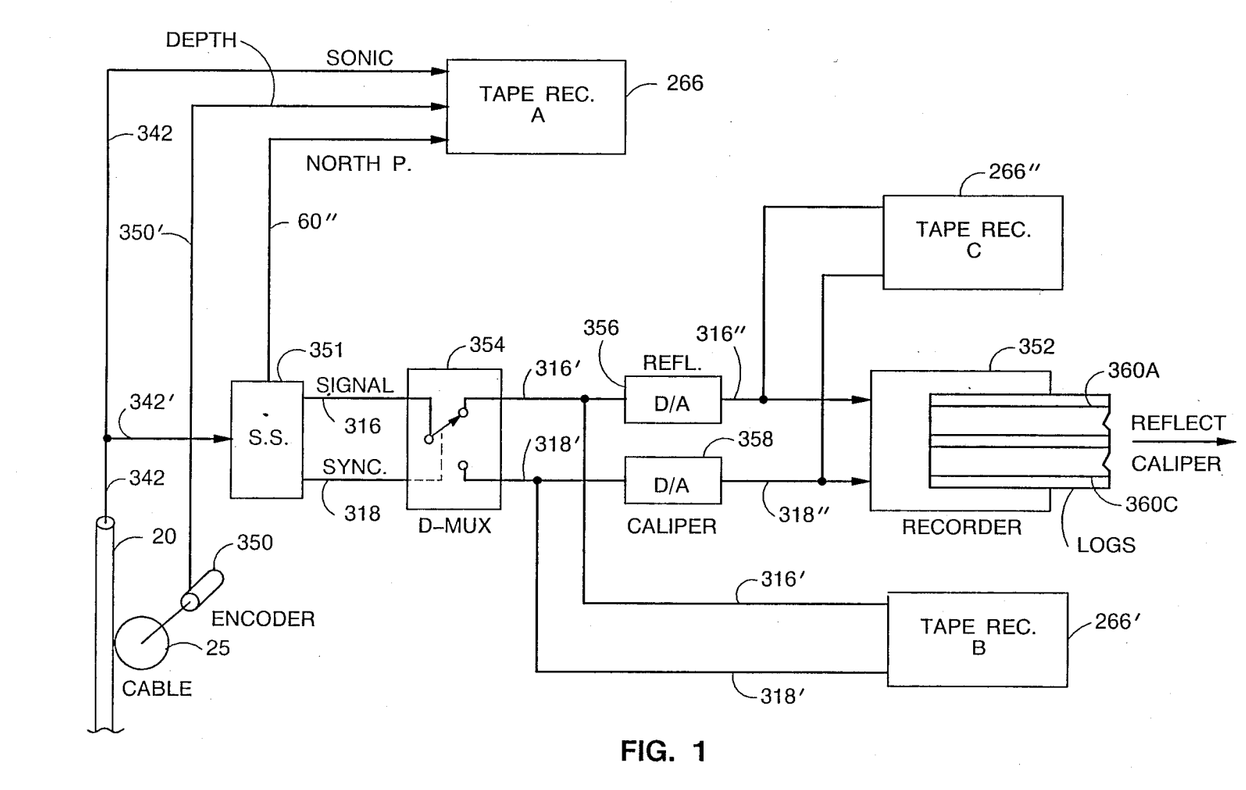
FIG. 1 is a copy of FIG. 8 of my now abandoned application, Ser. No. 242,504.

Referring now to the drawings, and in particular to FIG. 1, there are shown several types of recorders and display devices by means of which the electrical scan signals from a borehole televiewer can be displayed and recorded. This is a copy of FIG. 8 of my now abandoned, Ser. No. 242,504.

In FIG. 1 is shown a typical set of recorders and devices that can be used at the surface, to utilize the signal that has been generated in the sonde. While signals from multiple transducers can be recorded, FIG. 1 illustrates the case of a pair of digital signals, such as amplitude and caliper, which are multiplexed on the cable. The cable 20 is shown being metered up and down by means of a wheel 25, driven by the movement of the cable. The wheel as it turns rotates an encoder 350 which transmits pulse signals which are indicative of the angle of rotation of the wheel 25. The encoder 350 is a conventional device and outputs a signal over line 350' which goes to a digital tape recorder A, 266.

In FIG. 1 there are shown several types of recorders. Some are called tape recorders. Another, 352, is a CRO recorder, or cathode ray oscilloscope type recorder. This utilizes analog signals, such as the conventional electrical scan signals. The tape recorder is generally a digital tape or disc drive, which records digital signals of high frequencies. FIG. 1 is based on the assumption of a digital transmission, with two signals being multiplexed.

The sonic signals on the cable transmission channel 342 go directly through lead 342 to a digital tape recorder 266. The depth encoder 350 going by lead 350' to the tape recorder indicates information corresponding to depth of the sonde. The sync signal, or the north pulse coming from the compass, is separated out in the sync separator, marked SS, 351, and the north indicating pulse travels by line 60" to the tape recorder. Thus, all essential information arriving over the transmission channel is stored in the tape recorder 266 and can be played back later to recover the original signals for display in any one of a number of different ways.

So far as the two scan signals are concerned, they travel over lead 342' to SS,351. There, the sonic signal is separated out and goes over line 316 to the D-MUX 354. The synchronizing signal taken off the line 342' is used over line 318 to control the rate at which the demultiplexer 354 operates, so as to be in synchronism with the multiplexer in the sonde. The demultiplexer 354 is indicated as a synchronous switch that transmits the incoming signals on 316 to two separate lines 316' and 318'. Thus digital signals from each of the two transducers are then applied to individual digital-to-analog converters 356 and 358 respectively. The individual outputs are then taken by lines 316" and 318" to the cathode ray recorder 352. This is a very fast recorder, responsive to the normal high frequencies of the analog electrical scan signals.

One possible example of the two separated signals calls for one to be a reflection signal and the other to be a caliper signal. These can come from a single transducer, or can be taken from two separate transducers, one of high frequency and one of low frequency, which has previously been discussed. Conventional photograhpic means are provided to form the logs labelled 360A and 360C, respectively amplitude and caliper logs.

The signals on line 316' and 318' from the demultiplexer 354, which are individual digital signals, may also be recorded directly on digital recorder B 266'. The difference between this recorder 266' and recorder 266 is that the signal recorded on the digital tape recorder 266 is a multiplexed digital signal which can, if desired, be played back later through D-MUX 354, through D/A converters 356,358 and displayed as individual logs, and so on. On the other hand, digital tape recorder 266' has two channels, each one recording a complete digital signal transmitted from the sonde.

It is possible, of course, also to send the analog signals that would come from line 316" and 318" to an analog recorder such as 66" for storage and later playback.

Figure 2:
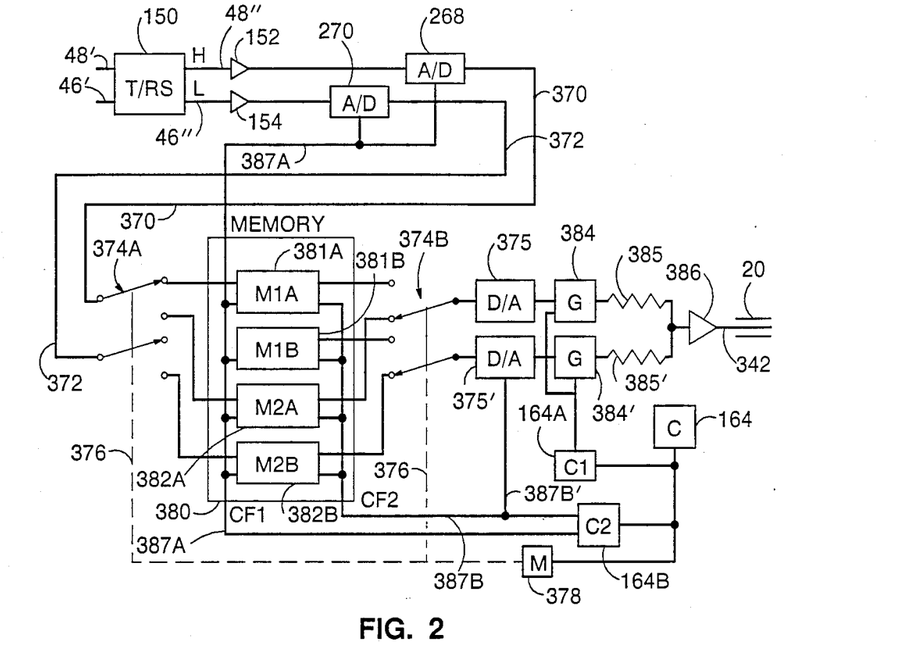
FIGS. 2 and 3 are copies of FIGS. 8 and 9 in my issued U.S. Pat., Ser. No. 4,524,433.
Figure 3:
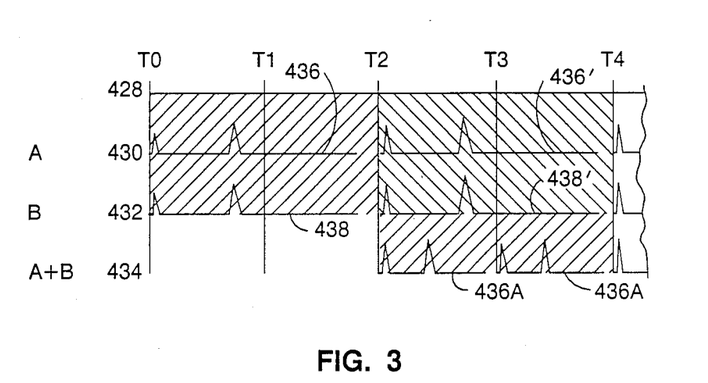

With reference to FIGS. 2 and 3 which are shown as FIGS. 8 and 9 of my issued U.S. Pat. No. 4,524,433 there is shown a memory unit in the box 380, which has four separate memory components M1A, M1B, M2A, M2B, etc., numbered respectively 381A, 381B, 382A, and 382B. Two switches 374A and 374B are provided, one at the inlets to the memories, and the other at the outlets from the memories. The two leads 370 and 372 from the A/D converters 268 and 270 go to the two inlet switches 374A, which can alternately connect these two lines to the first pair of memories M1A and M1B respectively, and on command, can switch the two lines to the second pair of memories with M2A and M2B, and back again, and so on.

The second switch 374B operates in a similar way but is 180° out of phase with the first switch 374A. In other words, when the leads 370 and 372 are connected to the first two memories, the switch 374B is connected to the second two memories, and vice versa. The outputs from the switch 374B go to D/A converters 375 and 375', then to gating means 384 and 384', through two equal resistors 385 and 385', where they are joined together, and to a line drive amplifier 386, the output of which is connected to the transmission channel 342 of the cable. The bit rate from the analog-to-digital converters 268 and 270 is identical to the rate of bit loading into the memories through switch 374A and is controlled by a clock of frequency CF1 on line 387A, which comes from a clock C2 164B. The readout from memory through switch 374B is controlled by a higher frequency bit rate CF2, supplied on lead 387B from the clock C2. The bit rate CF2 is normally twice that of CF1. However, if three or more separate transducers are to be demultiplexed from the cable, CF2 would be 3 or more times CF1.

There is a mechanism M, 378 driven by the base clock 164, which controls the switches 374A and 374B through means indicated by the dashed lines 376. These two switches are switched synchronously, but as mentioned, are out-of-phase. One is loading one pair of memories while the other is reading out of the second pair of memories, and so on. Also, the gating means 384 is controlled by a third frequency from clock C1, 164A.

Each of the clocks C1, C2, and M are controlled by the base clock C, 164, and frequencies are divided down in a manner well known in the art. However, while the frequencies for each of the controls may be different, they are all synchronously related through C.

Refer to FIG. 3 and consider for purpose of illustration that the two signals 436 and 438 are all in-phase. Both start at T0 and last till T2. The rectangle between lines 428 and 432, and T0 and T2 is shaded to indicate a first pair of memories M1A, M1B, into which these two signals are loaded. The next two signals 436' and 438' are loaded into the second memories M2A, M2B.

While the second signals are being loaded, the previously loaded 436 and 438 are being unloaded, in sequence, at double rate, as 436A and 438A. This sequence is repeated. When the second memories M2A and M2B are loaded, the next two will switch back to M1A and M1B, and so on. Thus, while two separate scan signals are being recorded, simultaneously, each degree of rotation, the two scan signals are being transmitted at double frequency in sequence.

Returning to FIG. 2, the purpose of the gating means 384 is that the two scan signals which are read out at a double bit rate will be transmitted sequentially in the time that a pair of transmit-receive signals is loaded into the opposite pair of memories in parallel. Of course, only one of these 436A and 438A is read out at a time. For example, the switch 374B is connected as shown to the lower pair of memories. It may be desired, for example, that M2A should be transmitted first, and so that is read out at double bit rate and passed by the gating means 384 and through resistor 385 and amplifier 386 to the line 342 to the cable. When that is completed, the second scan signal in M2B controlled by gate 384' is read out Referring now to FIG. 4, there is shown a schematic diagram of an apparatus for processing slow scan analog signals such as from a borehole televiewer, and converting them to high frequency analog scan signals, such as would be useful in display on television monitors and the like. By the use of the processing of this device, which I will call a scan converter, indicating that it is a device for converting from slow scan signals to TV raster scan signals.

It is well known that in displaying geographical or alphanumerical data on a television monitor tube, it is necessary to have a digital memory of sufficient capacity in digital bits, to display a great number of spots in a rectangular configuration, each of which are called pixels. Each pixel is a spot produced by the cathode ray tube of the when an image made from digital information is displayed on the monitor and may vary in brightness on a black and white display, over a considerable range. A greater range of brightness to be displayed requires a corresponding number of digital values to represent the particular value of a given pixel. Thus, the number of bits of storage required will be say $256\times240\times6=368,640$, for example. The digital television display utilizes 256 individual spots on the line, and 240 lines (noninterlaced) to the page. The number 6 would represent the number of bits required to display the range of brightness, or the magnitude or amplitude of the signal being recorded.

Another important thing about a TV monitor display is that the cathode ray beam follows a raster of sweeps across the screen first in one line and then onto a displaced line, and so on, until the page or frame of the tube is covered. However, the cathode ray tube is designed to be able to show rapid changes in a pattern of pixels, and therefore, whatever is displayed at a given time provides a brightness which decays rapidly with time. Therefore, the pixels must be replenished frequently, and this is done at a rate of about 60 times per second (for a noninterlaced TV monitor).

Thus, the memory must be large enough to hold all of these digital bits, and circuitry must be provided for continually passing the data from the memory to the display monitor and back to memory. What is called a random access memory, or RAM, is used for this purpose.

It will be clear that if the display picture on the monitor does not change with time, then the values of digital bits in the memory remains constant even though they are circulated out and back into the memory at a very high rate. If the data that are to be displayed on the monitor are changing with time, then electrical scan signals will be required to be inserted from time-to-time into appropriate locations in the memory. This is usually done while the circulation of the stored data is in process. If the incoming data are at the fast or TV raster scan rate, this is no great problem. However, if the scan data is of a low frequency, then there must be an additional part of this equipment that will convert the slow scan to the TV raster scan prior to introduction into the RAM.

The apparatus in FIG. 4 is of this nature and comprises a number of parts. Basically, there is a RAM 536 with a RAM memory controller 538 (both of which are conventional) from which data are being withdrawn in accordance with arrows 533 and 529, showing data being transmitted from the RAM 536 through an arithmetic device 532 and into a gate register. The same data stream then goes back to the RAM in accordance with arrows 530 and 534. While in the gate register the signals also travel by arrow 514 to a digital-to-analog (D/A) converter 516 and over line 518 to a synchronizer, by which the analog version of the digital data stored in the RAM are then passed to the cathode ray tube as a brightening signal, in accordance with the video display.

In FIG. 4 the incoming signals are on cable 504 from the sonde in the logging tool. They go through an amplifier 506 and then to an analog-to-digital (A/D) converter 508 to the gate register 502. If the incoming signals on cables 504 are already digital signals, then, of course, the analog-to-digital device 508 is not required. The digital signals then pass, in accordance with arrow 510, to the gate register 502.

The gate register 502 is an important part of the slow scan to fast scan converter. It provides a means of injecting the new log data into the circulating stream of digital bits travelling from the RAM 536 over lines 533 and 529 to the gate register and to line 514 to the display monitor, and also back over lines 530 and 534 to the RAM. This will be discussed in detail in accordance with FIG. 5 which shows in schematic form one embodiment of the gate register.

Referring back to FIG. 1 for a moment, there are shown a number of types of recording devices which have already been described. It is clear from such a diagram that any of the data displayed or recorded can be replayed back from the tape recorders and into the signal line 504 of FIG. 4. Thus, when I speak of a cable 504 producing the signals, I mean to include also my previously recorded logging scan signals which are replayed through the apparatus of FIG. 4.

Referring now to FIG. 5, there is shown one embodiment of a gate register, which is a device for converting slow scan signals into high frequency scan raster signals, so that they can be entered into the RAM of FIG. 4 at video scan rates. Here, the line 510 shows the input line from the (A/D) converter. For example, the low speed scan signal, either directly from the sonde, or from a replay of one of the previous recordings of these data, go over lines 510A and 510B to the registers 542A and 542B. Also going to the registers 542A and 542B are the high frequency TV raster scan signals from the RAM over line 552 which branches into lines 552A and 552B. The output lines from the registers 542A and 542B go by lines 558A to the output line 558, and also from the lower register 542B over line 558B to the output line 558, and over line 559 back to the RAM.

So far the part of FIG. 5 described is illustrated in greater detail in FIG. 6. Here the A/D converter 508 provides its signal on line 510 which goes to register 542A and also to 542B. In these registers, there are two separate registers, each of which can store as many bits as is in one line of the TV raster scan; that is, the number 256, for example, times the number of bits (such as 6) required to designate the amplitude of the signal. The incoming signal goes into register 630A which is a serial-in, parallel-out register. The output from the register 630A goes by way of parallel lines 636A to the second register 632A which is a serial or parallel serial-out register, which takes incoming TV raster scan digital signals over line 552A from the RAM 536 into the register and out over line 558A and line 558 to the (D/A) TV converter 516, and then to the TV monitor. The high frequency TV scan signals come from the RAM 536 over line 552 to both registers 542A and 542B, and are passed through the registers 632A or 632B and then out over the lines 558A or 558B and 559 back to the RAM, as well as to the output circuits.

Referring again to FIG. 2, it was clearly explained how a pair of low frequency scan signals coming in on lines 48' and 46', for example, could be converted by means of (A/D) converters, to the switch 374A, and alternatively stored in memory M1A and memory M1B or in memories M2A and M2B. The purpose here is to store a complete scan signal in each of the memories M1A and M1B at the slow input rate of the signals from the sonde, then later through switch 374B they are read from memories M1A and M1B at TV scan rates and converted to analog signals and then pass on to an output circuit.

FIG. 2 is shown primarily because it forms the basis of the apparatus of FIGS. 4, 5, and 6, except that here, of course, the rate of read-out is many times the rate of read-in; and while a slow read-in of scan signal is taking place in register 630A, the high frequency TV raster signals are being read-out of the RAM 536 and go by lines 552 and 552A and into and out of the register 632A. The two sync signals shown on lines 670 and 672 of FIG. 6 are different in that one is a low frequency repetition rate corresponding to that of the incoming logging signal while the other is a high frequency rate corresponding to the rate of the TV raster scan.

The sync signals on lines 670, 672 are those produced by the flip-flop 548 and the gates 545, 546 of FIG. 5, which control the shifting of the input first to register 542A, and then to 542B. The video signals are controlled by the video sync on line 544.

At an appropriate instant, while the signals are being read out of the RAM into the register 632A, for example, either on the first line of the page or the bottom line of the page, the signal of a slow scan that is stored in the register 630A can be instantly loaded into the memory locations of the register 632A. These load onto and destroy the previous data stored in those memory locations and leave the new data which is transferred from the register 630A. Thus, one line of the previous picture is now destroyed and in its place is a new line which has previously been accumulated in the register 630A.

When the register 630A has been filled at the slow rate a mechanism corresponding to the switches 374A and 374B of FIG. 2 causes the next scan data to be loaded into the lower register 630B and to be accumulated there until there is a full line of data. Once the loading has started in the lower register 630B, then the transfer by means of the parallel leads 636A can be done at a time appropriate to the circulation of the TV raster signals.

The sync signals on line 670 control the rate of read-in of slow data on the lines to boxes 542A and 542B, and the high frequency sync signals on 672 cause a read-out of data of the TV scan from the RAM, and so forth.

Figure 7A:
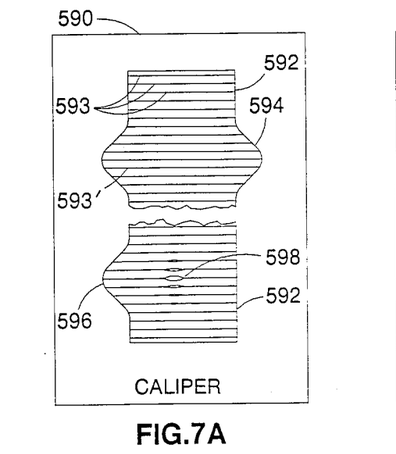
FIGS. 7A, 7B and 7C illustrate possible displays of caliper information for better visualization of the three-dimensional character of the surface being scanned by the borehole televiewer.

Once the slow scan data have been converted to TV raster scan and stored in the RAM, it is possible then to process the data in many ways. For instance, it can be displayed in the form of horizontal lines as in FIG. 7A, where the width of the page corresponds to 180° of rotation of the sonde. Consider that the caliper is being recorded, and the brightness of the spot is a function of the time of travel of the sonic signal from the transducer out to the reflecting surface and back again. There will be a picture such as shown in FIG. 7A. Assume that there is a washout, or a circumferential depression in the borehole wall, or of the pipe in a borehole, such as the event shown in the profile 594. The nominal wall diameter is shown by the straight portions 592. Then there is this "bulging", which can be seen in two ways; namely, by the outside contour 594 and by the brilliance of the spot and thus the density of the lines 593'.

If the depression in the surface of the wall is in the form of a blister, such as indicated in profile by the bulge 596, this is, of course, best seen when represented in profile as shown in FIG. 7A. On the other hand, if the bulge happens to be at an angle other than that at which the bulge is in profile, such as shown by the brightness of the lines 598, this will also indicate that the bulge or blister is of limited azimuthal extent.

Instead of indicating the travel time or caliper in terms of brightening of the beam, in a black and white presentation, it is possible also to control the color of the beam as a function of signal magnitude, and therefore, the display shown as black and white in FIG. 7A can, of course, be in color. Here, the bright lines might, for example, be red and the weak lines might be the blue or green or yellow so that there is a variation of color between the weak lines at 593 and the dark lines 593', which show a gradation from one color to another color.

This would be particularly advantageous, of course, in the lower part of FIG. 7A where the darkened portions of the scan lines could be in a different color and would be immediately recognizable as being a depression in the wall surface.

Of course, another way of representing circular scan data is by means of a polar diagram, which provides a very clear picture of a non-circular profile. However, while it shows the true profile of a given cross-sectional plane, it is not very useful in displaying a long series of horizontal planes. Dennis in his U.S. Pat. No. 3,550,075 has shown the convenience of making a "helical" display based on tilting the plane of the contour from the horizontal plane until it shows as an ellipse.

Figure 7B:
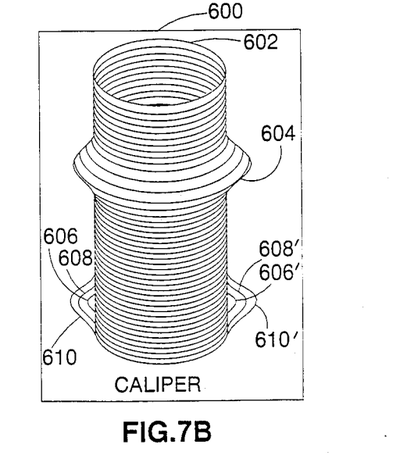

While this is helpful, particularly in recording data of brightness as a function of angle, it is useful to some extent in displaying the typical bulge 604 of FIG. 7B, that is, circumferentially more or less uniform. However, the best way that I have found for displaying a localized bulge or blister is to put the display in the form of FIG. 7A or 7C, that is, a linear display, or a helical display, and slowly rotating the picture to represent the scan starting at different azimuthal angles.

This rotation of the diagram is a very simple operation once the page data displayed on the TV raster screen are loaded into the RAM memory. Delaying the line synchronizing signal by one or more pixel positions causes a shift in the picture so that a different angle of view of the wall surface can be provided. This can be shown in the display, for example, of two 180° page displays of the slow scan signals on a conventional recorder, where the start of each line has been changed by shifting the north sync signal by a selected angle say 90° or 180°, and so on. However, the uniformly slow (or fast) rotation is not available except through the availability of the slow to raster scan apparatus described in the preceding FIGS. 4, 5, and 6.

As shown in FIG. 7B, if there is a blister such as 596 and it happens to be in the position shown in FIG. 7A, then as the picture 7A is rotated, the amplitude of the blister will be reduced say from 610, to 608, and to 606, as the blister is hidden behind the main picture, and then again at somewhat less than 180° it begins to appear as a small mound 606', and then a larger one 608', and a still larger one 610'. The angle between these appearances and the duration of the pattern of profile is a measure of the angular extent of the bulging.

It is not necessary to describe further the manner in which this rotation of the control for this rotation of the picture is made since the memory is a random access memory and it is possible to start at any angle and in a sense move the display around until that particular angle is on one margin, and then draws complete lines as before. It is a manner of delaying the sync signal and that would be well known to a man skilled in the art.

FIG. 7B is a photograph of the page display from the slow to fast raster scan converter corresponding to the top portion of FIG. 7B and illustrates the beneficial effect of recording caliper in the form illustrated in FIG. 7B. However, the optimum method of display would be on a rotation of the page of data.

Figure 8A:
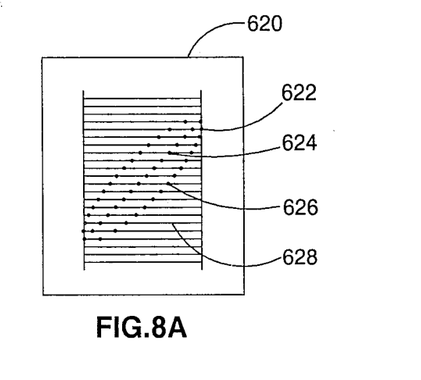
FIGS. 8A, 8B, 8C, 8D, and 8E illustrate various displays that can be provided by processing the data held in the memory of the TV raster scans.

Another important feature of the system of FIGS. 4, 5, and 6, for example, is that having the data in memory, many types of processing can be done which will serve to accentuate features of the data that would not be obvious in a simple straight line recording that is customarily used, at the present time, in the prior art. This is illustrated in FIG. 8A, for example, where on the conventional recorded page display, in a field of horizontal lines 628, there may be accentuation spots of some effect that is not quite clear, such as, for example, a linear arrangement of spots 624, or an oval representation of spots such as 626. By performing what is a measurement of differences between adjacent lines, it can be displayed in a line representing that difference. Thus where the data does not change rapidly, the differences between adjacent lines, or between the sums of adjacent groups of lines, will provide a signal of substantially zero amplitude and therefore will provide a uniform light background.

Figure 8B:
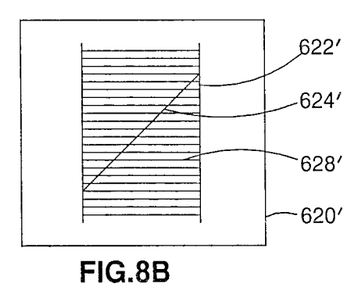

I have shown in FIG. 8B a white background with a dark line. It would very well be the opposite; that is, a dark background with a bright white line. Thus the picture in FIG. 8B would represent the event 624 in a differencing display, by line 624'. It is clear that the line 624' is much more visible and positive than the series of somewhat linearly arranged spots 624 of FIG. 8A.

Figure 8C:
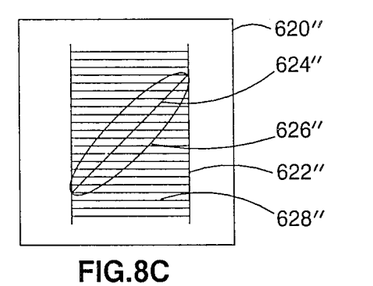

If the spots in FIG. 8A were in the shape of the oval 626 shown, a similar differencing of line 1-line 2, and line 2-line 3, and so on would show the oval diagram 626" of FIG. 8C.

Another advantage of the differencing display is that the difference signal will be small, so that the gain can be increased, to better show the difference signal.

It will be clear also that if the two diagrams 8B and 8C are from the same event such as, for example, an interface between two gelogic formations at an angle with the vertical, then by rotation of the diagram of FIG. 8B, it should change from line 624" into an oval such as 626", and back to a straight line 624", and so on.

Thus, one of the important things that can be done with this type of slow scan to raster scan converter is to provide a means of a continuous rotation of the diagram which will provide information as shown in FIGS. 7A and 7B. Also, by use of the differencing display in vertical differences, the diagram of FIGS. 8B and 8C would be a distinct improvement particularly when the combination of vertical differences and rotation are provided, which can be done with the apparatus of FIGS. 4, 5, and 6.

Figure 8D:
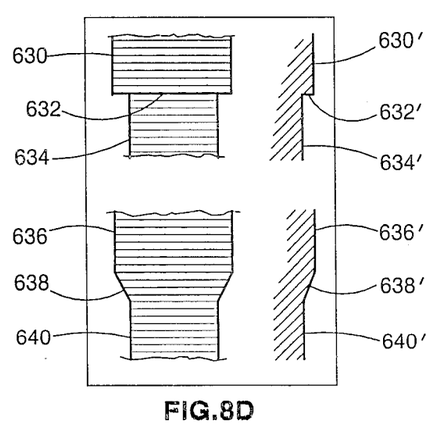

FIG. 8D shows a similar vertical differential display for a sharp change in diameter where the actual contour of the wall in diameter is illustrated by the line 632 and the step 632'. Similarly, for a graded or rounded step the vertical differential display would be shown as 636, 638, and 640.

Figure 8E:
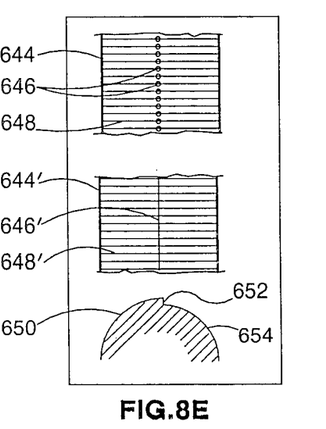

It is also possible to take sums or differences in a horizontal line as shown in FIG. 8E. Thus, if the horizontal line display is used and there is a line-up of points such as 646, then horizontal differencing would not only provide brighter display of the line 646', but it would also provide a lighter contrasting background 648'. This would represent a step in radius, for example, in a horizontal plane where the radius on one side of the step would be 650 and on the other side 654. Display of an oval-shaped cross-section could be improved by differencing.

Even if there is no pronounced line such as 646, just to run through the scan of rotation and differencing, etc. would be very useful because it would bring to light things that were not observed in the ordinary prior art displays. It will be clear also that if one can take differences in the horizontal line or differences in a vertical series of line, it is possible to combine these two by providing, in a sense, a differencing or summing action in any angular direction desired, and that is also contemplated with this apparatus. This would simply involve computer programming, which is well known in the art.

Referring again to FIG. 4, I have shown a box 566 labelled "computer". I have also shown the box 532 labelled "arithmetic unit". It will be clear that with control lines 567 and 568 between the computer 566 and the arithmetic unit and the RAM, respectively, the computer can control the arithmetic processing of the data stored in the RAM 536 through the means of the arithmetic unit 532, all of which is conventional.

Each of the parts 532, 536, and 566 are conventional and need no further description. Also, the process of storing video information in memory and circulating this out and in, to replenish the video picture, is old in TV work.

However, what is new is the gate register 502, which has been fully described in connection with FIGS. 5 and 6. This gate register makes possible not only the conversion of slow scan signals to TV raster scan signals, but also the continuous updating of the page of video information in the memory, each time that a new scan signal is relayed up the cable by the sonde.

Figure 9A:
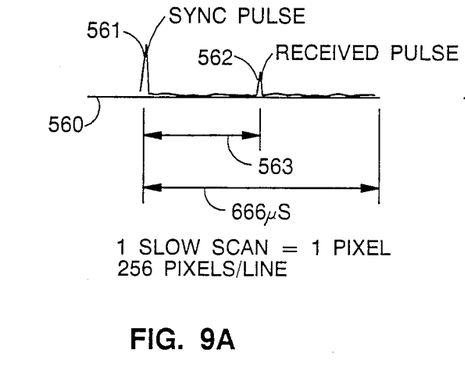
FIGS. 9A and 9B show typical slow rotary scan and TV raster scan signals.
Figure 9B:
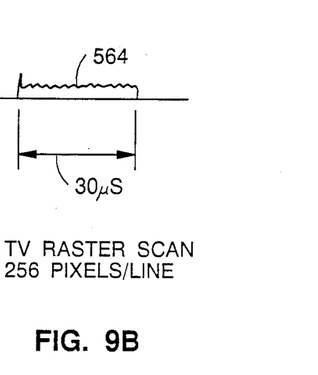

Reference is now made to FIGS. 9A and 9B. FIG. 9A shows schematically the typical sonic slow scan signal 560, having the transmitted pulse 561, and the reflected pulse 562, at a delay time of 563. This trace will be used to provide one pixel, or one spot, of light on the screen. This spot will be used to represent either the amplitude of reflection 562, or delay time 563, which is caliper.

The scan 560 takes 666 microseconds, so that one rotary scan of 256 transmitted pulses will take 666×256=170,000 microseconds (0.17 sec.), and that would provide 1 line of the page.

FIG. 9B illustrates the videoscan line 564, which includes 256 pixels and lasts 30 microseconds. Thus, the slow scan to raster scan converter takes a signal which lasts 170,000 microseconds and converts it to one lasting only 30 microseconds. This conversion makes it possible to plate 240 complete slow rotary scans on a page, which is continually updated as the sonde moves up the borehole.

Figure 10:
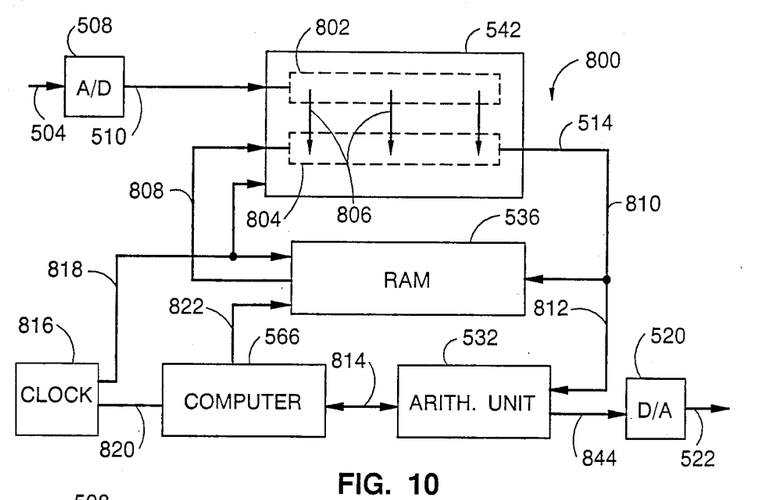
FIGS. 10, 11, and 12 illustrate modifications of FIGS. 4, 5, and 6 in which up to two gate registers and two RAMs are used to permit assembling a second page display while processing a first page display.

Referring now to FIG. 10, which is an extension of FIG. 6, there is indicated by the numeral 800 a system employing a single gate register, a single RAM, a computer control means, and an arithmetic unit for processing of the data. As was described in connection with FIG. 6, in the gate register 542 there are two digital registers, 802 and 804. The first accepts the incoming slow scan signals, which arrive on line 504, are converted to digital values in 508, and passed by lead 510 to the register 802 which is a serial-in, parallel-out register.

Associated with the register 802 is still another register 804, which is a serial-in, or parallel-in, serial-out. The arrows 806 indicate that when the register addresses in 802 are completely loaded, the stored data are transmitted as indicated by the arrows 806, out of the first register 802, and into the second register 804. Once transmitted over the leads 806 into the register 804, they then pass through line 514 and 810 into the RAM 536.

The RAM 536 contains all of the digital bits that are required to make up a page display on the T.V. monitor, not shown, but well known in the art. The digital data stored in the RAM are sequentially read out over lead 808 and transmitted to and through register 804, and out on line 514, to the D/A converter 520 and over line 522 to the T.V. monitor display. The data also return to the RAM over lead 810 so that the data are held in the RAM and continually refresh the picture on the T.V. monitor, while being conveniently accessible to updating by means of the transfer of bits from the register 802 to the register 804, as they are accumulated.

Since each of the registers 802 and 804 temporarily store enough digital bits to present a full line on the page display on the monitor, the display continually changes with the top line, for example, being replaced with a new one upon the completion of the rotation of the scanner in the sonde. Thus, viewing the T.V. monitor it is possible to visually follow the movement of the sonde up the borehole, and in doing so, continually exposing a new section of the borehole to the borehole televiewer, and presenting the new updated information to the monitor.

The lead 812 is shown connected to the input to the RAM and provides for passage of the serial trains of bits circulating from the RAM through the register 804 and back, to be presented to the arithmetic unit 532, which is controlled by the computer 566 over leads 814. If no arithmetical operation or processing is required, the data comes into the arithmetic unit, and out again, over lead 844 to the digital-to-analog converter 520, and to the display unit (not shown) over lead 522. The computer 566 receives timing or clock signals over lead 820 from the clock 816, which also times the RAM operations and the register operations, which must all be synchronized, over the leads 818. The computer also has a control over the RAM, over lead 822 in a well-known manner and need not be described in greater detail.

Comparison of FIG. 10 with FIG. 6 shows an important difference, in that two separate gate registers are shown in FIG. 6 feeding the RAM 536, whereas FIG. 10 only has one gate register.

Under some circumstances where the rate of circulation of data from the RAM to the display is very rapid, it may not provide sufficient time to transfer data from the register 802 into the register 804 in a short enough time to avoid interrupting this circulation operation. In that case, the two registers as shown in FIG. 6 would be useful; however, it is believed that it should be possible in most instances to use a single gate register to serve a single RAM as shown in FIG. 10.

In the accumulation of the electrical scan signals from the borehole, under present operating conditions, it takes of the order of 40 to 45 seconds to record sufficient rotations of the transducer in the sonde to complete a page of data on the T.V. monitor. Of course, just monitoring the incoming data as it modifies the page display on the T.V. monitor, will show everything that is happening. However, I believe that the processing of the data in various ways, as has been described in connection with FIGS. 7 and 8, can be extremely helpful. Since there is sufficient time during the period of 40 seconds or more, to accumulate a new page, I have shown in FIG. 11 a modification of FIG. 10 in which I show two RAMs, RAM I and RAM II, designated as 830 and 832 in FIG. 11. For the RAM to refresh and maintain the display on the T.V. monitor, all that is required is to circulate the digital trains out of the RAM to the monitor and back into the RAM. This does not require a gate register, because there is no change of data resulting from this refreshing operation. The need for the gate register, as has been earlier described, is to convert from the slow scan signals which come up the borehole, to the T.V. raster scan signals, which are acceptable to the T.V. monitor. Therefore, in FIG. 11 there is a combination, so to speak, of FIG. 10 which includes one gate register and one RAM, with the addition of a second RAM.

The manner of operation is as follows: The gate register and one RAM operate in accordance with the top portion of FIG. 10 to accumulate and build up in the RAM a full page display. While this is going on (and as was mentioned it may take up to 40 to 45 seconds) the second RAM is simply circulating out to the monitor and back again through the arithmetic unit. Thus it is possible to utilize the arithmetic unit to process the full page of digital data in the RAM in any of the ways previously described, and to display them on the T.V. monitor. Thus, without wasting any time so far as the accumulation of new signals is concerned, the person who may be monitoring these displays can not only monitor the original data coming in, but also monitor the data as processed in any selected way.

It is, of course, possible to record for later use either the analog signals going to the T.V. monitor, or the digital signals which are produced out of the arithmetic unit, in recorders which are well known and have been previously described.

Referring again to FIG. 11, there are corresponding numbers in many places, on many parts of the drawing, with those of FIG. 10. Briefly, the incoming signal on line 504 from the sonde is digitized in the converter 508 and goes to the gate register 542 which has been fully described in connection with FIG. 10. A pair of electronic switches, shown simply as mechanical switches 833 and 834, are provided for switching RAM 830 or RAM 832 to the gate register. In other words, while the RAM 830 is being filled with a second page, the data in the RAM, say for example RAM 830, is circulating out of line 808, through the switch 833, and through line 808 to the register 804, out through line 810 and through the switch back to the RAM. That is the process shown in FIG. 10. This circulation of data is not presented to the T.V. monitor because it is continually changing.

Figure 11:
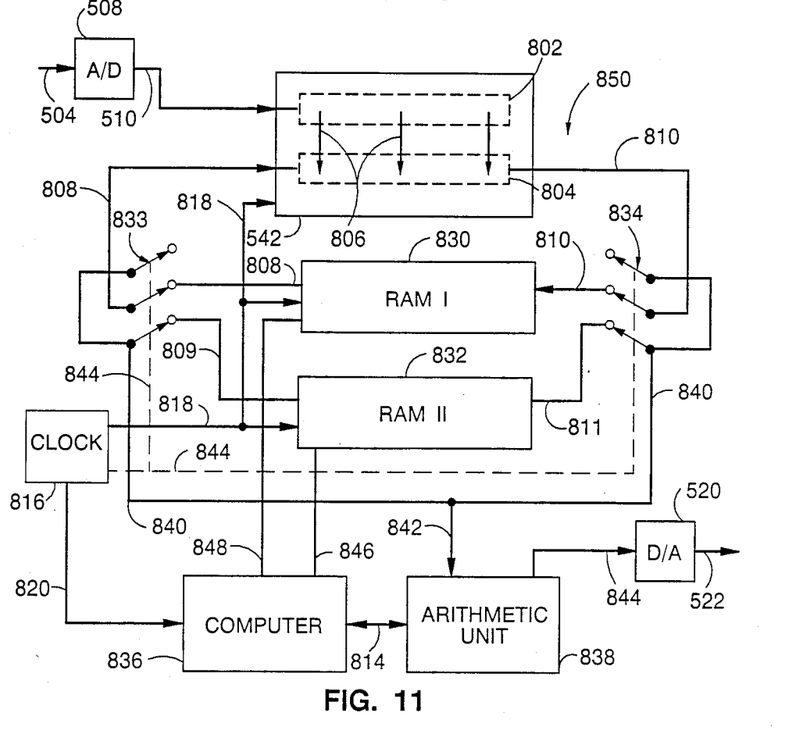

When the RAM 830 is filled, then the switches 833 and 834 are operated and the output of RAM I on line 808 goes by way of line 840 to the arithmetic unit over line 842 and, after processing or no processing, as desired, goes out over line 844 to the D/A converter 520 and line 522 to the monitor. While RAM 830 is now circulating to the arithmetic unit, RAM II is now switched through the gate register 542 and cooperates therewith to build up a new page display which, when it is completed, will be then routed through the arithmetic unit to the display in the same way that RAM 832 is now connected.

The computer operating through leads 814 controls the arithmetic unit to process the data coming into the unit over line 842, and going out over 844. Of course, the arithmetic unit may actually be a part of the computer, as is well known in the computer art, but is here shown separately. The computer controls the arithmetic unit and controls the RAM operations as well. A clock 816 not only times the computer over lead 820 but it also controls the timing of the switches 833 and 834 and also times the data bits in both the RAMs and the gate register.

In FIG. 11 I have therefore broken down the operation covered by FIG. 10 into two separate operations, that is, the accumulation of a new page of data for display on the monitor, and the processing and display of a page of data on the monitor. These are being done simultaneously by means of the two RAMs and the gate register and switches 833, 834. Therefore, by an on-line computer means, I can process these signals in any way desired to provide data which normally would not be available for some time after the complete log was finished, the data sent to a processing center, and returned for display.

Both FIGS. 10 and 11 show a single gate register serving a RAM in the process of building up a paged display of data for the T.V. monitor.

Figure 12:
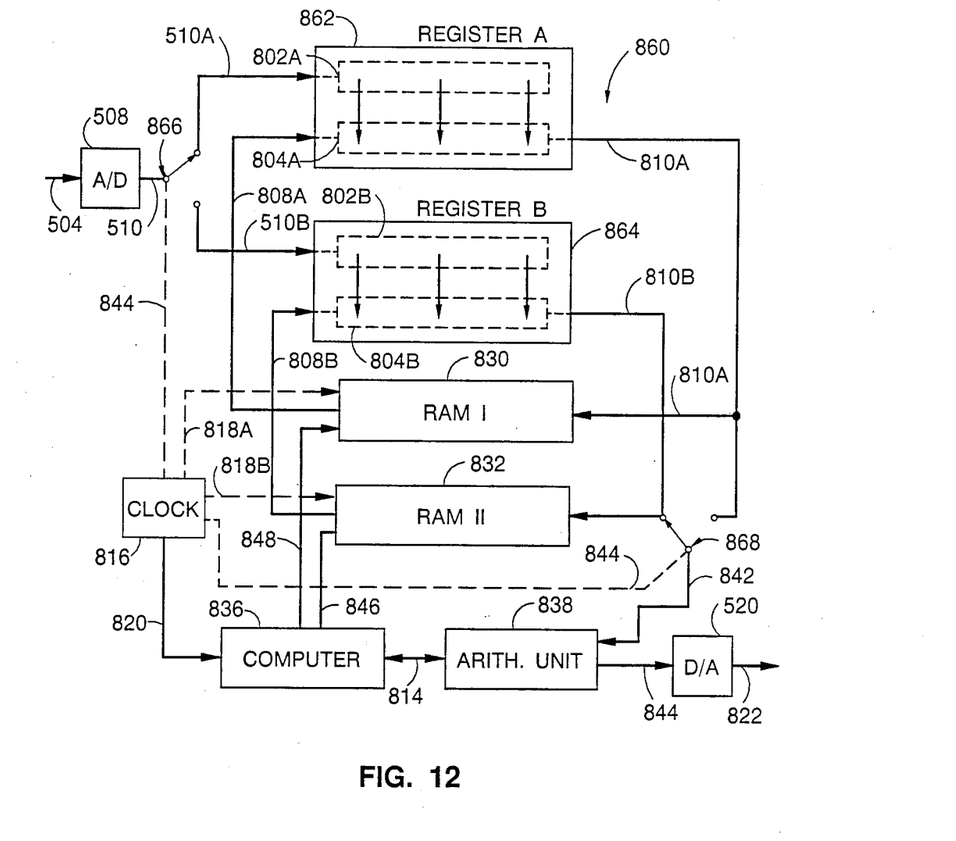

FIG. 12 is a combination of two systems such as shown in FIG. 10 to operate on the basis as described in connection with FIG. 11. That is, FIG. 12 includes a first register A which operates in connection with RAM I, and a second register B which operates in conjunction with RAM 832. These gate registers and RAMs are tied together, so that when one gate register is collecting the slow scanning data by means of its RAM, the second gate register and RAM are circulating through the arithmetic unit to the monitor.

The input signal on line 510 instead of going directly to a gate register, goes to a switch 866 which, in cooperation with switch 868, is controlled by the clock 816. This switch is timed to go from its first position to its second position as soon as a complete page of data has been stored in the RAM 830. When this happens, and a complete page of display has been stored in the RAM 830, the data are now ready for display, and the switches 866 and 868 operate so that the output of RAM 830 over lead 810A then goes through the switch 868 over line 842 to arithmetic unit 838, and to the D/A over line 842 to arithmetic unit 838, and to the D/A control converte 520 and then to the monitor.

By switching the switches 866 and 868 at the same time, the incoming signal then goes into register 802B; and in cooperation with RAM 832, is accumulating a new page display without going to the monitor, in a manner similar to that of FIG. 11. FIGS. 10, 11, and 12 carry out similar types of operations, but have different details of construction.

What has been described is a method and apparatus for converting slow rotary scan signals from a sonic logging sonde to high frequency TV raster scans for display and processing on TV monitors.

This makes it possible to assemble a great number of sonic scan signals, to form a video frame, or page, and then to provide any of a number of ways to process those data to accentuate desirable features of the display.

The data can be permanently recorded at any stage of the processing and can, of course, be photographed on the face of the monitor, or can be stored in a video tape unit, or as digital signals.

While I have illustrated the conversion of slow scan signals to raster scan signals and their subsequent processing, while using only a signal from a single rotating transducer, it will be clear the multiple signals from multiple rotating transducers can be used in ways suggested in my issued U.S. Pat. No. 4,524,433, and my co-pending application, Ser. Nos. 242,497 and 524,498.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In the processing of borehole televiewer rotary electrical scan signals (ESS) produced by a sonde while logging a borehole in the earth to produce a continuously visible display of an acoustic reflecting surface of the borehole on a raster scan television (TV) monitor, the improved method of operation for producing the continuously visible display changing with time as rotary ESS are provided at a rate representative of the rate of receiving rotary ESS from the sonde, comprising the steps of:

(a) providing a train of rotary ESS in digital form;

(b) loading the train of rotary ESS in digital form into a register for accumulating and storing the train at a rate representative of the rate of receiving the train of rotary ESS from the sonde;

(c) producing a continuously visible display on a TV monitor by circulating a stream of digitized ESS from a random access memory (RAM) to the TV monitor and back to the RAM by reading digitized ESS out of the RAM at a television raster scan signal rate in the form of sequential trains of digital bits to a digital-to-analog (D/A) converter and then to the TV monitor, representing each train of digital bits on the TV monitor as a separate line display, and positioning successive line displays adjacent, and parallel to, the previous line display to form a page display;

(d) transferring the train of rotary ESS out of the register at a TV raster scan rate; and (e) inserting the train transferred from the register into the circulating stream of digitized ESS for display as a first line display on the page display.

2. The method as in claim 1 including the step of processing said trains of digital bits in said register.

3. The method as in claim 1 including the step of making a permanent record of the signals displayed on said TV monitor.

4. The method as in claim 3 in which the step of making said permanent record comprises the step of photographically recording the face of TV monitor.

5. The method as in claim 3 in which the step of making said permanent record comprises the step of video tape recording the signals from said D/A converter which go to said TV monitor.

6. The method as in claim 1, in which the step of providing the train or rotary ESS comprises the step of simultaneously receiving said rotary ESS on-line from said sonde.

7. The method as in claim 1, in which the step of providing the train of rotary ESS comprises the step of receiving said rotary ESS from a playback of a record previously made of the rotary ESS received from said sonde.

8. The method as in claim 2 in which said step of processing said trains of digital bits comprises at least the step of
adding a selected train of said digital bits to at least one other train of digital bits.

9. The method as in claim 2 in which said step of processing said trains of digital bits comprises at least the step of
adding the sum of a selected number of said trains of digital bits to at least one more selected train of digital bits.

10. The method as in claim 2 in which the step of processing said trains of digital bits comprises at least the step of
subtracting a selected train of digital bits from another selected train of digital bits.

11. The method as in claim 2 in which the step of processing said trains of digital bits comprises at least the step of
subtracting a first sum of a first selected number of selected trains of digital bits from a second sum of a second selected number of selected trains of digital bits.

12. The method as in claim 2 in which each train of digital bits comprises a one line display on said display TV monitor, and each pixel on said line is dependent on a group of a selected number of adjacent digital bits, and in which the step of processing comprises the sequential steps of at least adding a first group of adjacent digital bits representative of a first pixel to a second group of adjacent digital bits representative of a second adjacent pixel.

13. The method as in claim 2 in which each train of digital bits comprises a one line display on said display TV monitor, and each pixel on said line is dependent on a group of a selected number of adjacent digital bits, and in which the step of processing comprises at least the sequential steps of at least subtracting a first group of adjacent digital bits representative of a first pixel from a second group of adjacent digital bits representative of a second adjacent pixel.

14. The method as in claim 2 and in which each train of digital bits comprises a one line display on said displays TV monitor and each pixel on said line is dependent on a group of a selected number of adjacent digital bits, and in which the step of processing comprises at least the sequential steps of
(a) selecting a first and a second line of pixels across the face of said monitor, at any selected angle to the horizontal;
(b) sequentially withdrawing from said RAM the separate groups of bits representing each pixel in said first line, to form a first angular train of bits;
(c) sequentially withdrawing from said RAM the separate groups of bits representing each pixel in said second line, to form a second angular train of bits; and
(d) processing together at least said first and said second angular train of bits.

15. The method as in claim 14 in which said step of processing together at least said first and said second angular train of bits comprises at least the step of adding said first angular train to said second angular train of bits.

16. The method as in claim 14 in which said step of processing together at least said first and said second angular train of bits comprises at least the step of subtracting said first angular train from said second angular train of bits.

17. In an apparatus for sonic logging of a deep borehole in the earth so as to produce a continuously visible display of an acoustic reflecting surface of the borehole on a raster scan television (TV) monitor which provides rotary electrical scan signals (ESS) produced by a sonde having at least one rotating transducer, and cable means to transmit said ESS to the surface, the improvement for producing the continuously visible display changing with time as rotary ESS are provided at a rate representative of the rate of receiving rotary ESS from the sonde, comprising means for converting the rotary scan signals from said sonde to TV raster scan signals, for storing said signals in a random access memory (RAM) and for displaying said TV raster scan signals, comprising:

(a) means for producing a continuously visible display on a TV monitor by circulating a stream of digitized ESS from the RAM to the TV monitor and back to the RAM by reading digitized ESS out of the RAM at a television raster scan signal rate in the form of sequential trains of digital bits to a digital-to-analog (D/A) converter and then to the TV monitor, representing each train of digital bits on the TV monitor as a separate line display, and positioning successive line displays adjacent and parallel to, the previous line display to form a page display;
(b) at least a first register means for accumulating and storing at least a first rotary scan signal in said first register means in the form of a first train of digital bits;
(c) means for transferring out of said first register means said first train of digital bits; and
(d) means for transmitting at TV raster scan rate said first train of digital bits to said TV monitor for display as a first line display and to said RAM.

18. The apparatus as in claim 17 and including a second register means for accumulating and storing a second rotary scan signal in the form of a second train of digital bits; and including
means responsive to the accumulation of a first ESS in the form of a complete train of digital bits, to transfer the incoming rotary ESS to said second register means, and vice versa.

19. The apparatus as in claim 18 and including:
(a) a third register means operating in conjunction with said first register means; and
(b) means to read out of said memory means trains of digital bits and to transmit them to and through said third register means, to said display means and back to said memory means;
(c) means, on command, for transferring said first train of digital bits in said first register means to corresponding addresses in said third register means; and
(d) means for transmitting from said third register means said first train of digital bits to said TV monitor, and to said memory means.

20. The apparatus as in claim 19 and including:
(a) a fourth register means operating in conjunction with said second register means; and
(b) means to read out of said memory means trains of digital bits and to transmit them to and through said fourth register means, to said display means and back to said memory means;
(c) means, on command, for transferring said second train of digital bits in said second register means to corresponding addresses in said fourth register means; and
(d) means for transmitting from said fourth register means said second train of digital bits to said TV monitor, and to said memory means.

21. The apparatus as in claim 20 and including digital-to-analog D/A converter means between the outputs of said third register means and said fourth register means, and the inlet to said TV monitor.

22. The apparatus as in claim 17 in which said first and second register means each comprises a serial-in, parallel-out register.

23. The apparatus as in claim 21 in which said third and fourth register means each comprises a serial or parallel-in, serial-out register.

24. The apparatus as in claim 17 and including means to add at least one line display on said TV monitor to at least one other line display on said TV monitor.

25. The apparatus as in claim 17 and including means to subtract at least one line display on said TV monitor from at least one other line display on said TV monitor.

26. The apparatus as in claim 20 and including means for adding at least a first signal corresponding to a selected first pixel in a selected line in a multiple line display on said TV monitor; to at least a second signal corresponding to a selected second pixel in said selected line on said TV monitor.

27. The method as in claim 3 in which the step of making said permanent record comprises the step of digitally recording said sequential trains of digital bits.

28. The method as in claim 2 and including the additional step of monitoring said page display.

29. The apparatus of claim 17 wherein:
the means for transferring out comprises a second register into which the first train of digital bits accumulated and stored in the first register means is transferred when register addresses in the first register means are completely loaded.

30. The apparatus of claim 17 wherein each train of digital bits is representative of a rotation of a sonde in the borehole and wherein each train of digital bits is displayed as a single line display of the page display.

31. The method of claim 1 wherein:
the step of transferring comprises transferring the train of digital bits accumulated and stored in the register when register addresses in the register are completely loaded.

32. The method of claim 1 wherein each train of digital bits is representative of a rotation of the sonde in the borehole and wherein each train of digital bits is displayed as a single line display of the page display.

* * * * *

UNITED STATES PATENT OFFICE
CERTIFICATE OF CORRECTION

PATENT NO. : 4,740,930

DATED : April 26, 1988

INVENTOR(S) : Robert A. Broding

It is certified that error appears in the above-identified patent and that said Letters Patent are hereby corrected as shown below:

Column 5, line 19-20, after "abandoned" and before the comma, insert --application--.

Column 6, line 25, "66" should read --266--.

Column 7, line 51, after "the" and before "when", insert --monitor--; line 58, after "The" and before "digital", insert --normal--; line 62, "or", second occurrence, should read --of--.

Column 9, line 28, "parallel" should read --parallel-in--.

Figure 7C:
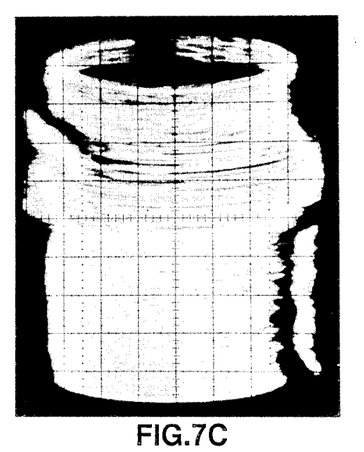

Column 11, line 11, "7C" should read --7B--; line 46, "Fig. 7B" should read --Fig. 7C--.

Column 13, line 31, "plate" should read --place--; line 44, after "is" and before "another", delete "still".

Column 16, line 25, delete "over line 842 to arithmetic unit 838, and to tl D/A"; line 26, "converte" should read --converter--.

Claim 6, Column 17, line 42, "or" should read --of--.

Claim 12, Column 18, line 6, after "said" delete "display".

Claim 13, Column 18, line 15, after "said" delete "display".

Claim 14, Column 18, line 24-25, after "said" delete "displays".

Signed and Sealed this

Eleventh Day of October, 1988

Attest:

DONALD J. QUIGG

Attesting Officer

Commissioner of Patents and Trademarks